US010838406B2

(12) United States Patent
Livingston (10) Patent No.: US 10,838,406 B2
(45) Date of Patent: Nov. 17, 2020

(54) SYSTEMS AND METHODS FOR THE PATTERNING OF MATERIAL SUBSTRATES

(71) Applicant: The Aerospace Corporation, El Segundo, CA (US)

(72) Inventor: Frank Edward Livingston, Redondo Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 25 days.

(21) Appl. No.: 16/108,050

(22) Filed: Aug. 21, 2018

(65) Prior Publication Data

US 2018/0356797 A1    Dec. 13, 2018

Related U.S. Application Data

(63) Continuation-in-part of application No. 15/469,132, filed on Mar. 24, 2017, now Pat. No. 10,613,513, (Continued)

(51) Int. Cl.
  *G05B 19/4155*    (2006.01)

(52) U.S. Cl.
  CPC ............ *G05B 19/4155* (2013.01); *G05B 2219/45041* (2013.01)

(58) Field of Classification Search
  CPC .... B23K 26/043; B23K 26/064; B23K 26/03; B23K 26/06; B23K 26/0624;
  (Continued)

(56) References Cited

U.S. PATENT DOCUMENTS 3,745,995 A    7/1973 Kraus
3,820,534 A    6/1974 Kraus et al.
(Continued)

FOREIGN PATENT DOCUMENTS

WO    WO-2012023786 A2 *   2/2012   ............ G06F 8/52

OTHER PUBLICATIONS

Livingston et al., "Chapter 9: Laser Processing Architecture for Improved Material Processing"; Laser Processing of Materials: Fundamentals, Applications, and Developments, P. Schaaf, Ed., Springer Series Materials Science, Springer-Verlag, Berlin; (2010), pp. 189-224.

(Continued)

*Primary Examiner* — Darrin D Dunn
(74) *Attorney, Agent, or Firm* — Duane Morris, LLP (57) ABSTRACT

A system includes a computing device that generates at least one process script for the modification to a glass ceramic substrate and at least one pattern script that corresponds to the process script. The computing device also merges the process script with the pattern script and generates a plurality of command signals that are based on the merged process and pattern scripts. An energy source generates a plurality of light beams based on the generated command signal(s). A waveform apparatus generates at least one waveform signal to customize the generated light beams based on the generated command signal(s). At least one modulating component modulates the generated light beams based on generated command signal(s). An optical assembly is configured to apply the modulated plurality of light beams to the glass ceramic substrate. At least one motion stage encoder is configured to provide at least one three dimensional (3D) coordinate position of the optical assembly with respect to the motion control drive in order to coordinate application of the modulated light beams with a predefined spatial location.

12 Claims, 4 Drawing Sheets

Related U.S. Application Data which is a continuation-in-part of application No. 14/163,712, filed on Jan. 24, 2014, now Pat. No. 10,228,666, which is a continuation-in-part of application No. 13/767,055, filed on Feb. 14, 2013, now Pat. No. 8,679,189.

(60) Provisional application No. 61/763,223, filed on Feb. 11, 2013.

(58) Field of Classification Search
CPC .............. B23K 26/083; B23K 26/0853; B23K 26/0006; B23K 26/0626; B23K 26/067; B23K 26/359; B23K 15/0013; G05B 15/02; G05B 19/40938; G05B 2219/37578; G05B 2219/45165; G05B 2219/50087
See application file for complete search history.

(56) References Cited

U.S. PATENT DOCUMENTS

| | | |
|---|---|---|
| 4,195,367 A | 4/1980 | Kraus |
| 4,214,322 A | 7/1980 | Kraus |
| 4,978,323 A | 12/1990 | Freedman |
| 5,030,236 A | 7/1991 | Dean |
| 5,032,129 A | 7/1991 | Kurze et al. |
| 5,163,958 A | 11/1992 | Pinchuk |
| 5,170,403 A | 12/1992 | Mayer |
| 5,233,175 A | 8/1993 | Latta et al. |
| 5,383,935 A | 1/1995 | Shirkhanzadeh |
| 5,456,724 A | 10/1995 | Yen et al. |
| 5,976,187 A | 11/1999 | Richelsoph |
| 6,034,295 A | 3/2000 | Rehberg et al. |
| 6,080,155 A | 6/2000 | Michelson |
| 6,083,264 A | 7/2000 | Wood et al. |
| 6,120,502 A | 9/2000 | Michelson |
| 6,123,705 A | 9/2000 | Michelson |
| 6,143,036 A | 11/2000 | Comfort |
| 6,149,650 A | 11/2000 | Michelson |
| 6,387,096 B1 | 5/2002 | Hyde, Jr. |
| 6,423,935 B1 | 7/2002 | Hackel et al. |
| 6,481,440 B2 | 11/2002 | Gielen et al. |
| 6,489,985 B1 | 12/2002 | Brodsky et al. |
| 6,602,296 B1 | 8/2003 | Day et al. |
| 6,605,089 B1 | 8/2003 | Michelson |
| 6,627,321 B1 | 9/2003 | Ellingsen et al. |
| 6,712,853 B2 | 3/2004 | Kuslich |
| 6,783,920 B2 | 8/2004 | Livingston et al. |
| 7,179,295 B2 | 2/2007 | Kovacevic |
| 7,248,940 B2* | 7/2007 | Neumann ............ B23K 26/046 219/121.6 |
| 7,455,672 B2 | 11/2008 | Michelson |
| 7,526,357 B2* | 4/2009 | Livingston ......... B23K 26/0626 438/689 |
| 7,579,077 B2 | 8/2009 | Dubrow et al. |
| 7,708,778 B2 | 5/2010 | Gordon et al. |
| 7,742,511 B2 | 6/2010 | Murison et al. |
| 7,824,444 B2 | 11/2010 | Biscup et al. |
| 8,075,630 B2 | 12/2011 | Ricci et al. |
| 8,197,551 B2 | 6/2012 | Swain et al. |
| 8,273,610 B2 | 9/2012 | Or-Bach et al. |
| 8,378,258 B2 | 2/2013 | Sercel et al. |
| 8,679,189 B1 | 3/2014 | Ganey et al. |
| 8,723,074 B2* | 5/2014 | Sercel ................ B23K 26/16 219/121.67 |
| 8,772,671 B2* | 7/2014 | Broude ............... B23K 26/032 219/121.69 |
| 8,785,813 B2* | 7/2014 | Shah .................. B23K 26/38 219/121.69 |
| 8,835,798 B2 | 9/2014 | Rumsby |
| 9,018,562 B2 | 4/2015 | Dantus |
| 9,104,194 B2* | 8/2015 | Mori .................. G05B 19/4163 |
| 9,358,636 B2* | 6/2016 | Hammann ............ B23K 26/03 |
| 9,486,877 B2 | 11/2016 | Unrath |
| 10,228,666 B2* | 3/2019 | Livingston .............. G05B 15/02 |
| 2002/0024714 A1 | 2/2002 | Sandstrom et al. |
| 2002/0044197 A1 | 4/2002 | Furumiya et al. |
| 2002/0072823 A1 | 6/2002 | Belanger |
| 2002/0185610 A1 | 12/2002 | Stern |
| 2003/0040806 A1 | 2/2003 | MacDonald |
| 2003/0071994 A1* | 4/2003 | Borden ................. G01N 21/274 356/326 |
| 2003/0083746 A1 | 5/2003 | Kuslich |
| 2004/0031779 A1* | 2/2004 | Cahill ..................... B23K 26/04 219/121.83 |
| 2004/0254665 A1* | 12/2004 | Fink ...................... B29C 64/153 700/98 |
| 2005/0005642 A1* | 1/2005 | Kaplan ................. B23K 26/032 63/32 |
| 2005/0018738 A1* | 1/2005 | Duan ..................... B41J 3/4071 372/55 |
| 2005/0029965 A1 | 2/2005 | Yamaguchi et al. |
| 2005/0058190 A1 | 3/2005 | Sato et al. |
| 2005/0103760 A1* | 5/2005 | Kaplan ................. B23K 26/032 219/121.68 |
| 2005/0228503 A1 | 10/2005 | Gundolf |
| 2005/0256586 A1 | 11/2005 | Kraus et al. |
| 2006/0028655 A1 | 2/2006 | Cordingley et al. |
| 2006/0068334 A1 | 3/2006 | Sandstrom et al. |
| 2006/0088074 A1 | 4/2006 | Johnstone et al. |
| 2006/0089642 A1 | 4/2006 | Diaz et al. |
| 2006/0097430 A1* | 5/2006 | Xiaochun ............. B23K 26/18 264/400 |
| 2006/0102601 A1 | 5/2006 | Shirk et al. |
| 2006/0102608 A1* | 5/2006 | Katsuta ................. B23K 26/03 219/121.83 |
| 2006/0126477 A1* | 6/2006 | Livingston ......... B23K 26/0626 369/116 |
| 2006/0137688 A1 | 6/2006 | Aisenbrey |
| 2006/0159916 A1 | 7/2006 | Dubrow et al. |
| 2006/0181997 A1 | 8/2006 | Tanase |
| 2006/0184211 A1 | 8/2006 | Gaunt et al. |
| 2006/0191884 A1 | 8/2006 | Johnson et al. |
| 2006/0241766 A1 | 10/2006 | Felton et al. |
| 2006/0293724 A1 | 12/2006 | Kronberg et al. |
| 2007/0073455 A1 | 3/2007 | Attawia et al. |
| 2007/0141106 A1 | 6/2007 | Bonutti |
| 2008/0043220 A1* | 2/2008 | Kaplan ................. B23K 26/032 356/30 |
| 2008/0232817 A1 | 9/2008 | Futami et al. |
| 2009/0067455 A1 | 3/2009 | Murison et al. |
| 2009/0088857 A1 | 4/2009 | Michelson |
| 2009/0125099 A1 | 5/2009 | Weber et al. |
| 2009/0163981 A1 | 6/2009 | Stevenson et al. |
| 2009/0188901 A1* | 7/2009 | Dantus ................. B23K 26/032 219/121.76 |
| 2009/0243756 A1 | 10/2009 | Stevenson et al. |
| 2009/0273353 A1 | 11/2009 | Kroh et al. |
| 2009/0292344 A1 | 11/2009 | Lowry et al. |
| 2009/0326602 A1 | 12/2009 | Glukhovsky et al. |
| 2010/0140160 A1 | 6/2010 | Dubrow et al. |
| 2010/0141729 A1* | 6/2010 | Petsch ..................... B41M 5/267 347/225 |
| 2010/0168867 A1 | 7/2010 | Swain et al. |
| 2010/0197116 A1* | 8/2010 | Shah ...................... B23K 26/38 438/463 |
| 2010/0260029 A1 | 10/2010 | Kurihara et al. |
| 2011/0013175 A1* | 1/2011 | Davis ................... G03F 7/70625 356/72 |
| 2011/0021899 A1 | 1/2011 | Arps et al. |
| 2011/0024400 A1 | 2/2011 | Rumsby |
| 2011/0026552 A1 | 2/2011 | Iwasaki |
| 2011/0034975 A1 | 2/2011 | Ferree |
| 2011/0048770 A1 | 3/2011 | Reiterer et al. |
| 2011/0054582 A1 | 3/2011 | Dabney et al. |
| 2011/0060419 A1 | 3/2011 | Choi et al. |
| 2011/0182319 A1 | 7/2011 | Hua et al. |
| 2011/0245924 A1 | 10/2011 | Kuslich et al. |
| 2011/0267593 A1* | 11/2011 | Hsieh ..................... G02B 7/28 355/55 |
| 2011/0272575 A1 | 11/2011 | Kim et al. |
| 2011/0288468 A1 | 11/2011 | Dadd et al. |

(56) References Cited

U.S. PATENT DOCUMENTS

| | | |
|---|---|---|
| 2012/0002687 A1 | 1/2012 | Ershov et al. |
| 2012/0003463 A1 | 1/2012 | Dry |
| 2012/0009391 A1 | 1/2012 | Dry |
| 2012/0015318 A1* | 1/2012 | Kasenbacher ....... A61C 1/0046 433/29 |
| 2012/0058100 A1 | 3/2012 | Shastri et al. |
| 2012/0071979 A1 | 3/2012 | Zipnick |
| 2012/0095558 A1 | 4/2012 | Wooley et al. |
| 2012/0138586 A1* | 6/2012 | Webster ............. B23K 15/0013 219/121.64 |
| 2012/0185047 A1 | 7/2012 | Wooley |
| 2012/0232330 A1 | 9/2012 | Geiges |
| 2012/0241427 A1 | 9/2012 | Maltsev et al. |
| 2012/0248595 A1 | 10/2012 | Or-Bach et al. |
| 2012/0251835 A1 | 10/2012 | Dry |
| 2012/0259264 A1 | 10/2012 | Swain et al. |
| 2012/0276754 A1 | 11/2012 | Cordingley et al. |
| 2012/0277812 A1 | 11/2012 | Kraus et al. |
| 2012/0296190 A1 | 11/2012 | Kondabatni et al. |
| 2012/0302821 A1 | 11/2012 | Burnett |
| 2012/0309237 A1 | 12/2012 | Marzano et al. |
| 2012/0316482 A1 | 12/2012 | Karim |
| 2012/0328905 A1 | 12/2012 | Guo et al. |
| 2013/0010349 A1 | 1/2013 | Cordingley et al. |
| 2013/0023794 A1 | 1/2013 | Stein et al. |
| 2013/0066447 A1* | 3/2013 | Baierl-Moehler ........................... G05B 19/40938 700/86 |
| 2013/0094529 A1 | 4/2013 | Wakabayashi |
| 2013/0101251 A1 | 4/2013 | Kawamura et al. |
| 2013/0110114 A1 | 5/2013 | Gomaa et al. |
| 2013/0113510 A1 | 5/2013 | Kasapi |
| 2013/0120740 A1* | 5/2013 | Schonleber .......... B23K 26/032 356/72 |
| 2013/0139088 A1* | 5/2013 | King .................. G05B 19/4093 715/771 |
| 2013/0166039 A1 | 6/2013 | Shaw-Klein |
| 2013/0215916 A1 | 8/2013 | Kakizaki et al. |
| 2013/0226025 A1 | 8/2013 | Bourlion et al. |
| 2013/0226273 A1 | 8/2013 | Dabney et al. |
| 2013/0244121 A1 | 9/2013 | Gogotsi |
| 2013/0245736 A1 | 9/2013 | Alexander et al. |
| 2013/0253297 A1 | 9/2013 | Johnson et al. |
| 2013/0328504 A1 | 12/2013 | Yavor |
| 2014/0098410 A1 | 4/2014 | Cordingley et al. |
| 2014/0110384 A1 | 4/2014 | Kleinert et al. |
| 2014/0228991 A1 | 8/2014 | Livingston et al. |
| 2014/0263223 A1 | 9/2014 | Unrath |
| 2015/0025667 A1* | 1/2015 | Shindo .................... B23P 15/24 700/98 |
| 2015/0336208 A1 | 11/2015 | Sokol et al. |
| 2016/0167164 A9* | 6/2016 | Rosario ............. B23K 26/0006 347/225 |
| 2018/0356797 A1 | 12/2018 | Livingston |

OTHER PUBLICATIONS

M. E. Lines and A.M. Glass, "Chapeter 8: Oxygen Octahedra"; Principles and Applications of Ferroelectrics and Related Materials; Claredon Press, Oxford, 1977, pp. 241-246.

J. Wolff, Das Gesetz der Transformation der Knochen, Verlag bon August Hirschwald, Berlin, Germany, 1892, (ISBN) 978-3-86805-648-8.

Wilson et al., "Life on Earth", Sinauer Association, Stamford, CT 1973.

J. Brannon, J. Greer, and H. Helvajian, "Laser Processing for Microengineering Applications." In: Microengineering Aerospace Systems, ed. by H. Helvajian, The Aerospace Press, El Segundo, CA 1999 pp. 145-198.

A.J. Ikushima, T. Fujiwara, and K. Saito, "Silica glass: A material for photonics", Journal of Applied Physics, vol. 88, No. 3, pp. 1201-1213, (Aug. 2000).

H. Becker, M. Arundell, A. Harnisch, and D. Hulsenberg, "Chemical analysis in photostructurable glass chips", Sensors and Actuators B 86, pp. 271-279 (Apr. 2002).

M. Toner, and H. Buettner, "Microfabrication in Biology and Medicine", Biotechnol. Prog. 14, p. 355 (1998).

W. Holand, and G. H. Beall, "Glass-Ceramic Technology", The American Ceramic Society, Westerville, OH 2002.

S.D. Stookey, "Catalyzed Crystallization of Glass in Theory and Practice", Industrial and Engineering Chemistry, vol. 51, No. 7, pp. 805-808 (Jul. 1959).

M. Tashiro, and M. Wada, "Glass-Ceramics Crystallized with Zirconia. In: Advances in Glass Technology", Plenum Press, New York, NY 1963, pp. 18-19.

A.G. Pincus, "Application of Glass-Ceramics." In: Advances in Nucleation and Crystallization in Glasses, ed. by L.L. Hench, S.W. Frieman, The American Ceramic Society, Columbus, OH 1971, pp. 210-223.

S.D. Stookey, "Chemical Machining of Photosensitive Glass", Industrial and Engineering Chemistry, vol. 45, No. 1, pp. 115-118 (Jan. 1953).

S.D. Stookey, "Photosensitive Glass: A New Photographic Medium" Industrial and Engineering Chemistry , vol. 41 No. 4, pp. 856-861, (Apr. 1949).

P.J. Brock, M.D. Levenson, J.M. Zavislan, and J.R. Lyerla, "Fabrication of grooved glass substrates by phase mask lithography", Journal of Vacuum Science & Technology B: Microelectronics and Nanometer Structures Processing, Measurement, and Phenomena B, vol. 9, No. 6, pp. 3155-3161 (Nov./Dec. 1991).

T.R. Dietrich, W. Ehrfeld, M. Lacher, M. Kramer, and B. Speit, "Fabrication technologies for microsystems utilizing photoetchable glass", Microelectronic Engineering 30, pp. 497-504 (1996).

Livingston and Helvajian, "Photophysical Processes that Lead to Ablation-Free Microfabrication in Glass-Ceramic Materials." In: 3D Laser Microfabrication, ed. by H. Misawa, S. Juodkazis, Wiley-VCH, Weinheim, 2006 and references therein.

Y. Cheng, K. Sugioka, M. Masuda, K. Shihoyama, K. Toyoda, and K. Midorikawa, Proceedings of SPIE: "Three-dimensional micro-optical components embedded in Foturan glass by a femtosecond laser", Proc. SPIE 5063, pp. 103-107 (Nov. 18, 2003).

W. W. Hansen, S.W. Janson, and H. Helvajian, Proceedings of SPIE: "Direct-write UV-laser microfabrication of 3D structures in lithiumaluminosilicate glass", Proc. SPIE 2991, Laser Applications in Microelectronic and Optoelectronic Manufacturing II, (May 9, 1997) pp. 104-112.

J. Kim, H. Berberoglu; and X. Xu, "Fabrication of microstructures in photoetchable glass ceramics using excimer and femtosecond lasers", J. Microlith. Microfab. Microsyst. vol. 3, No. 3, pp. 478-485 (Jul. 2004).

F.E. Livingston and H. Helvajian, Proceedings of SPIE: "True 3D volumetric patterning of photostructurable glass using UV laser irradiation and variable exposure processing: fabrication of meso-scale devices", Proc. SPIE 4830, Third International Symposium on Laser Precision Microfabrication, (Feb. 19, 2003), pp. 189-195.

F.E. Livingston and H. Helvajian, "Variable UV laser exposure processing of photosensitive glass-ceramics: maskless micro- to meso-scale structure fabrication",Appl. Phys. A 81, pp. 1569-1581 (2005).

F.E. Livingston and H. Helvajian, "Photophysical Processes That Activate Selective Changes in Photostructurable Glass Ceramic Material Properties", NATO Advance Science Institutes—Photon Based Nanoscience and Nanobiotechnology 239, pp. 225-265 (2006).

M. Masuda, K. Sugioka, Y. Cheng, T. Hongo, K. Shihoyama, H. Takai, I. Miyamoto, and K. Midorikawa, "Direct fabrication of freely movable microplate inside photosensitive glass by femtosecond laser for ab-on-chip application", Appl. Phys, A 78, pp. 1029-1032 (2004).

K. Sugioka, M. Masuda, T. Hongo, Y. Cheng, K. Shihoyama, and K. Midorikawa, "Three-dimensional microfluidic structure embedded in photostructurable glass by femtosecond laser for lab-on-chip applications", Appl. Phys, A 79, pp. 815-817 (2004).

S.W. Janson, A. Huang, W.W. Hansen, and H. Helvajian, "Development of an Inspector Satellite Propulsion Module Using Photostructur- (56) References Cited

OTHER PUBLICATIONS able Glass/Ceramic Materials", AIAA paper 2004-6701, Conference on Micro-Nano-Technologies, Monterey, CA, pp. 1-12, (Nov. 2004).

V. Arbuzov, "Photostimulated electron transfer between coactivator ions in alkali silicate glasses", Journal of Non-Crystalline Solids 253, pp. 37-49 (1999).

J.S. Stroud, "Photoionization of Ce3+ in Glass", The Journal of Chemical Physics, vol. 35, No. 3, pp. 844-850 (Sep. 1961).

J.S. Stroud, "Color Centers in a Cerium-Containing Silicate Glass", The Journal of Chemical Physics, vol. 37, No. 4, pp. 836-841 (Aug. 15, 1962).

M. Talkenberg, E.W. Kreutz, A. Horn, M. Jacquorie, and R. Poprawe, Proceedings of SPIE: "UV laser radiation-induced modifications and microstructuring of glass", Proc. SPIE 4637, Photon Processing in Microelectronics and Photonics, (Jun. 18, 2002).

A. Berezhnoi, "Glass-Ceramics and Photo-Sitalls", Plenum Press, New York, NY 1970.

F.E. Livingston, W.W. Hansen, A. Huang, and H. Helvajian, Proceedings of SPIE: "Effect of laser parameters on the exposure and selective etch rate in photostructurable glass", Proc. SPIE 4637, Photon Processing in Microelectronics and Photonics, (Jun. 18, 2002) pp. 404-412.

F.E. Livingston, P.M. Adams, and H. Helvajian, "Examination of the laser-induced variations in the chemical etch rate of a photosensitive glass ceramic", Appl. Phys. A 89, pp. 97-107 (2007).

\* cited by examiner

SYSTEMS AND METHODS FOR THE PATTERNING OF MATERIAL SUBSTRATES

I. RELATED AND CO-PENDING APPLICATION

This application is a continuation-in-part of and claims priority to co-pending U.S. patent application Ser. No. 15/469,132 entitled SYSTEMS AND METHODS FOR MODIFYING MATERIAL SUBSTRATES filed Mar. 24, 2017, which is a continuation in part of and claims priority to U.S. patent application Ser. No. 14/163,712 entitled MATERIAL MODIFICATION ASSEMBLY AND METHOD FOR USE IN THE MODIFICATION OF MATERIAL SUBSTRATES filed Jan. 24, 2014, which is a continuation-in-part of and claims priority to U.S. patent application Ser. No. 13/767,055 entitled BONE GROWTH ENHANCING IMPLANT filed Feb. 14, 2013 and issued as U.S. Pat. No. 8,679,189 on Mar. 25, 2014, which claims the benefit of U.S. Provisional Application 61/763,223, filed Feb. 11, 2013, the disclosures of which are incorporated herein by reference in their entirety.

II. BACKGROUND

At least some known material substrates, such as glass-ceramics (GCs), are a unique and versatile material class that combine the properties of sintered ceramics with the characteristics of inorganic glasses, to yield hybrid materials that can retain substantially no porosity or defects. These hybrid materials can have high transparency or opalescence, chemical resistance, biocompatibility, and relatively high strength and toughness. At least some of these properties make GCs suited for applications in aerospace engineering, photonics, biotechnology and medicine, among other fields. The key attribute that separates GCs from other material classes is the coexistence of the amorphous glass phases and the crystalline phases that comprise the GC. More specifically, the ability to influence the interplay between these two phases and control the precipitation of soluble ceramic phases from the base glass enables the GC substrate to be imbued with various functionalities.

Structural fabrication in GCs can be achieved through the use of optical patterning and high-temperature annealing. Exposure to actinic radiation initiates the photo-activation process, forming a "latent" image in the GC that corresponds to trapped optical defect states in the material. The irradiated sample is then baked at a high temperature to transform the latent image into a visible or "fixed" permanent image.

However, continued exposure of at least a portion of the sample or component to such high temperatures can result in appreciable thermal stresses and temperature gradients in the sample. As a result, the use of high-temperature annealing may not be compatible with many materials or integrated systems, such as electronics, optics, plastics, organic substrates and thin films. In addition, the need to utilize high temperature annealing in conjunction with optical patterning precludes the single-step fabrication of multi-functional systems. Thus, current processing and manufacturing technologies rely on the separate fabrication of discrete elements, each with their own function, followed by post-process alignment and assembly.

BRIEF DESCRIPTION

The embodiments described herein enable a single step approach to create and/or modify material substrates, such as GCs, by patterning, or "writing" structures and phases into the substrates in-situ. Using this approach, the material substrate may have a wide range of phases and compositions having various functionalities, structures, and properties. For example, in one embodiment, a material modification assembly is provided. The material modification assembly includes a computing device that is configured to generate at least one process script for the modification to the material substrate and to generate at least one pattern script that corresponds to the process script, for the modification to the material substrate. The computing device is also configured to merge the generated process script with the corresponding generated pattern script and to generate a plurality of command signals that are based on the merged generated process script and the corresponding generated pattern script. An energy source is configured to couple to the computing device, wherein the energy source is further configured to generate a plurality of light beams based on at least one of the generated command signals. A motion control drive is configured to couple to the computing device and the energy source, wherein the motion control drive is further configured to generate a waveform type indicator based on the at least one of the plurality of command signals. A waveform apparatus is configured to couple to the computing device, the energy source, and the motion control drive. The waveform apparatus is further configured to generate at least one waveform signal based on the at least one of the generated plurality of command signals and the waveform type indicator. At least one modulating component is configured to couple to the computing device, the waveform apparatus, and the energy source, wherein the modulating component is further configured to modulate the generated plurality of light beams with the waveform signal based on at least one of the generated command signals. In addition, an optical assembly is configured to couple to the modulating component, and the optical assembly is further configured to apply the modulated plurality of light beams to the material substrate. At least one motion stage encoder is configured to couple to the motion control drive and the optical assembly, wherein the motion stage encoder is further configured to provide at least one three dimensional (3D) coordinate position of the optical assembly with respect to the motion control drive in order to coordinate application of the modulated light beams with a predefined spatial location.

In another embodiment, a method to modify at least one material substrate is provided. At least one process script is generated, via a computing device, to modify the material substrate. At least one pattern script that corresponds to the process script is generated, via the computing device, to modify the material substrate. The process script is merged with the corresponding pattern script. A plurality of command signals are generated, wherein the command signals are based on the merged process script and the corresponding pattern script. A plurality of light beams are generated, via an energy source, based on at least one of the command signals. A waveform type indicator is generated, via a motion control drive, based on at least one of the command signals. At least one waveform signal is generated, via a waveform apparatus, based on at least one of the command signals. The light beams are then modulated with the waveform signal, via a modulating component. The modulating is based on at least one of the command signals. The modulated light beams are applied to a GC substrate, via an optical assembly. At least one three dimensional (3D) coordinate position of the optical assembly with respect to the motion control drive is provided, via a motion stage encoder, in order to coordinate application of the modulated light beams with a predefined spatial location.

In yet other embodiments, a system to modify at least one material substrate is provided. The system comprises a GC substrate and a modification assembly positioned proximate to the GC substrate. The modification assembly comprises a computing device configured to generate at least one process script for the modification to the GC substrate and to generate at least one pattern script that corresponds to the at least one process script, for the modification to the GC substrate. The computing device then merges the at least one process script with the corresponding at least one pattern script and generates a plurality of command signals based on the merged process scripts and the corresponding pattern scripts. An energy source is configured to couple to the computing device, wherein the energy source is configured to generate a plurality of light beams based on at least one of the command signals. A motion control drive is configured to couple to the computing device and the energy source, wherein the motion control drive is configured to generate a waveform type indicator based on at least one of command signals. A waveform apparatus is configured to couple to the computing device, the energy source, and the motion control drive, wherein the waveform apparatus is configured to generate at least one waveform signal based on at least one of the command signals and the waveform type indicator. At least one modulating component is configured to couple to the computing device, the energy source, the motion control drive, and the waveform generator, wherein the modulating component is further configured to modulate the generated plurality of light beams with the waveform signal based on at least one of the command signals. An optical assembly is configured to be coupled to the at least one modulating component, wherein the optical assembly is further configured to apply the modulated plurality of light beams to the GC substrate. At least one motion stage encoder is configured to be coupled to the motion control drive and the optical assembly, wherein the motion stage encoder is further configured to provide at least one three dimensional (3D) coordinate position of the optical assembly with respect to the motion control drive in order to coordinate application of the modulated plurality of light beams with a predefined spatial location.

DETAILED DESCRIPTION

The embodiments described herein enable the in-situ patterning of material substrates, such as GC substrates, with various phases, such that the GC substrate can be imbued with various functionalities and can create complex highly integrated systems within the GC substrate. Such systems can include photonic, bionic, and electronic systems among others. The embodiments described herein include, for example, the use of laser scripted pulse modulation techniques to directly transform the amorphous phases of the GC matrix into discrete etchable (soluble) phases, thus inducing site-selective phase conversion during the laser patterning process. Such techniques enable for the control and definition of variations in the electrical and optical character, mechanical compliance, and chemical solubility of the GC substrate. The laser genotype modulation approach can be translated to other photo-structurable GCs and a wide array of other related materials, including organic-inorganic hybrids and mixed composites.

Figure 1:
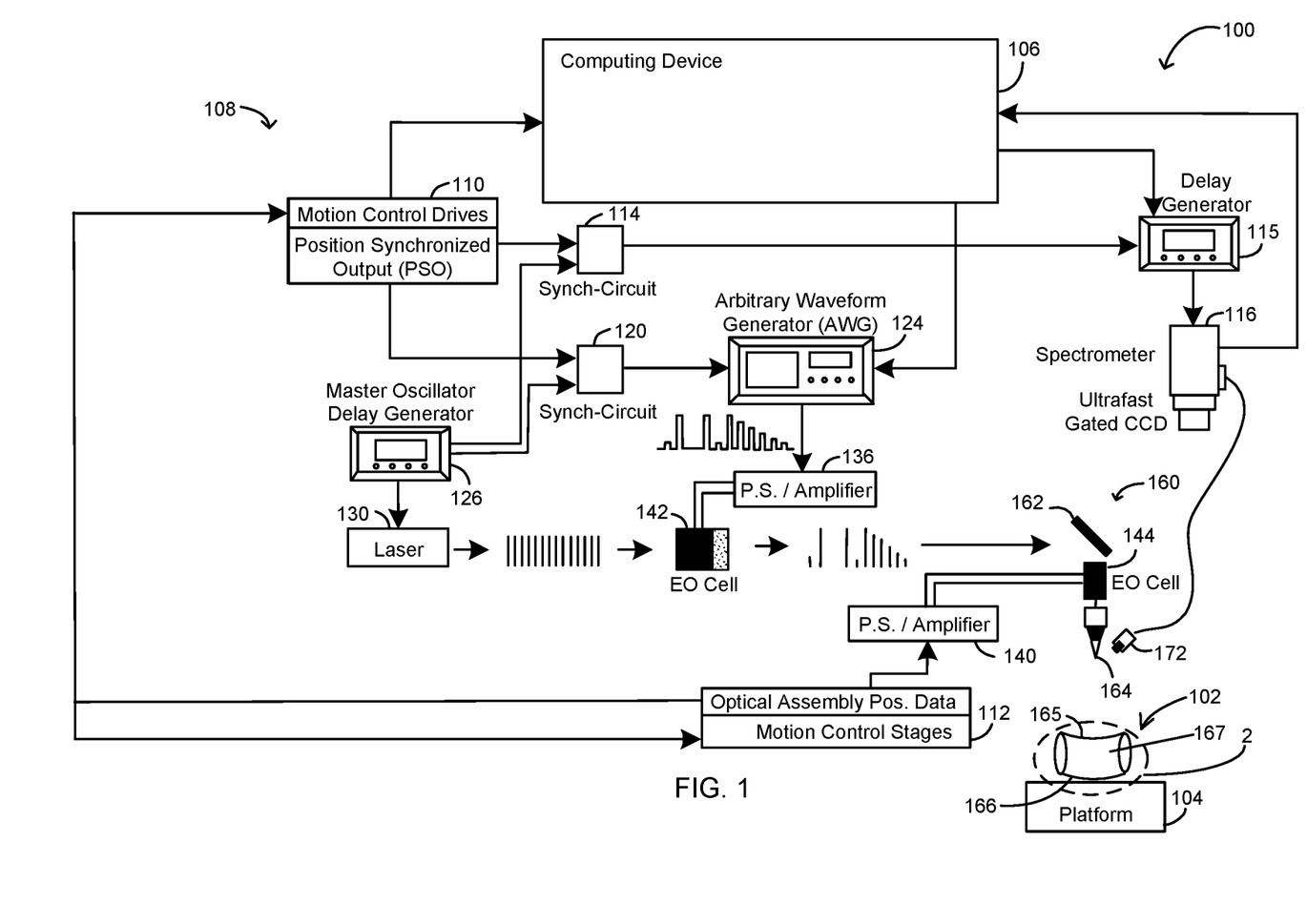
FIG. 1 is block diagram of an exemplary system that includes a material substrate in accordance with some embodiments of the present disclosure.

FIG. 1 illustrates an exemplary system 100. In some embodiments, system 100 can be a GC substrate enhancing system that is configured to design and create, for example, an optical device, such as a waveguide, or an ND filter. For example, in some embodiments, system 100 includes a material substrate 102 that is positioned on a platform 104 (e.g. a surgical table), wherein material substrate 102 can be modified to form, for example, the optical device. It should be noted that the present disclosure is not limited to optical devices or systems and one of ordinary skill in the art will appreciate that the current disclosure may be used in connection with other types of systems that are used to modify various types of material substrates. For example, in some embodiments, system 100 can be a power system that is used to modify, such as texturize, a metal component (not shown), such as a turbine.

In some embodiments, system 100 includes a computing device 106 that can be, for example, a desktop computer, laptop, mobile device, tablet, thin client, or other device having a communications interface (not shown) that can communicate with other components of system 100, as explained in more detail below with respect to FIG. 2. For example, in some embodiments, computing device 106 is coupled to a motion control apparatus 108 via a suitable connection, including, but not limited to, an electrical conductor, a low-level serial data connection, such as Recommended Standard (RS) 232 or RS-485, a high-level serial data connection, such as USB, a field bus, a PROFIBUS®, or Institute of Electrical and Electronics Engineers (IEEE) 1394 (a/k/a FIREWIRE), a parallel data connection, such as IEEE 1284 or IEEE 488, a short-range wireless communication channel such as BLUETOOTH, and/or a private (e.g., inaccessible outside system 100) network connection, whether wired or wireless. IEEE is a registered trademark of the Institute of Electrical and Electronics Engineers, Inc., of New York, N.Y. BLUETOOTH is a registered trademark of Bluetooth SIG, Inc. of Kirkland, Wash. PROFIBUS is a registered trademark of Profibus Trade Organization of Scottsdale, Ariz. It should be noted that, as used herein, the term "couple" is not limited to a direct mechanical, thermal, communication, and/or an electrical connection between components, but may also include an indirect mechanical, thermal, communication and/or electrical connection between multiple components.

In some embodiments, motion control apparatus 108 includes motion control drives 110 and a motion control stage 112. Motion control apparatus 108 is coupled to a first synch circuit 114 that is coupled to a delay generator 115 and to a detection device, such as a spectrometer 116. In some embodiments, first synch circuit 114 can be any suitable commercially available circuit that is programmed to control the timing of signals being channeled through system 100 based on information received from computing device 106. In some embodiments, spectrometer 116 can be any suitable commercially available spectrometer, detection device, sensing element or similar monitoring instrument.

In some embodiments, motion control apparatus 108 is coupled to a second synch circuit 120 that is coupled to a waveform generator 124 and a master oscillator delay generator 126. In some embodiments, waveform generator 124 can be any suitable commercially available arbitrary waveform generator. Second synch circuit 120 can also be any suitable commercially available circuit that is programmed to control the timing of signals. In some embodiments, an energy source, such as a laser 130, is coupled to master oscillator delay generator 126. In some embodiments, laser 130 can be any suitable laser that is configured to generate a plurality of pulsed light beams. In some embodiments, other types of energy sources can be used instead of lasers, such as electron beams, x-rays, proton beams, and lamp and arc sources.

In some embodiments, waveform generator 124 is also coupled to an amplifier 136 and motion control apparatus 108 is coupled to an amplifier 140. In some embodiments, amplifiers 136 and 140 are each configured to alter any signals received therein. The signals can be altered according to a transfer function, such as to apply a gain factor to multiply the voltage or current or numerically digitized amplitude of the signals received therein to generate modified output signals, such as an amplified signal.

In some embodiments, system 100 also includes one or more modulating devices or components, such as a first electro-optic (EO) modulator cell 142 and a second EO modulator cell 144. First EO modulator cell 142 is coupled to amplifier 136 in some embodiments. Second EO modulator cell 144 is coupled to an optical assembly 160 that includes an optical device, such as a lens or mirror 162, and a focusing conduit 164 to focus the light beams that go through lens 162 onto material substrate 102. For example, in some embodiments, the light beams are focused onto at least a portion of top exterior surface 165, bottom exterior surface 166, and/or side exterior surface 167. In some embodiments, when other types of energy sources are used instead of laser 130, they can be modulated by devices other than EO cell modulators 142 and 144 to generate scripts of the other energy types, such as electron scripts, proton scripts, x-ray scripts etc. Motion control stage 112 is coupled to optical assembly 160 and is configured to monitor the position of optical assembly 160 so as to continuously output the position of optical assembly 160 to the motion control drives 110. Motion control stage 112 may include a motion stage encoder (not shown) to encode the position of optical assembly 160, as discussed in more detail below.

Spectrometer 116 is positioned proximate to material substrate 102 such that a sensing element or a transducer 172 of spectrometer 116 is coupled to at least a portion of material substrate 102. Spectrometer 116 is also coupled to computing device 106. In some embodiments, spectrometer 116 is configured to detect various aspects of the modification being performed on material substrate 102.

During operation of system 100, photons are administered in discrete and pre-defined packets, synchronized with the modification pattern and geometry, to create a tapestry or mosaic of material states on material substrate 102 with different phases, compositions, and functionalities. For example, as explained in more detail below with respect to FIGS. 2-4, computing device 106 is configured to generate at least one process script for the modification to material substrate 102 and to generate at least one pattern script that corresponds to the process script, for the modification to material substrate 102. Computing device 106 merges the generated process script with the corresponding generated pattern script and generates a plurality of command signals that are based on the merged process script and pattern script. Laser 130 receives at least one of the generated command signals and laser 130 generates a plurality of light beams based on the received command signal. Waveform generator 124 is also configured to receive at least one of the generated command signals and to generate at least one waveform signal for customization of the generated light beams based on the received command signal. In addition, EO modulator cells 142 and 144 can also receive at least one of the generated command signals and are configured to modulate the generated light beams with the at least one wave form signal based on the received command signal. Motion control drives 110 receives at least one of the generated command signals and controls at least one parameter of the light beams based on the command signal, as well as the optical assembly 160 position information received from the motion control stage 112, as discussed in more detail below.

Figure 2:
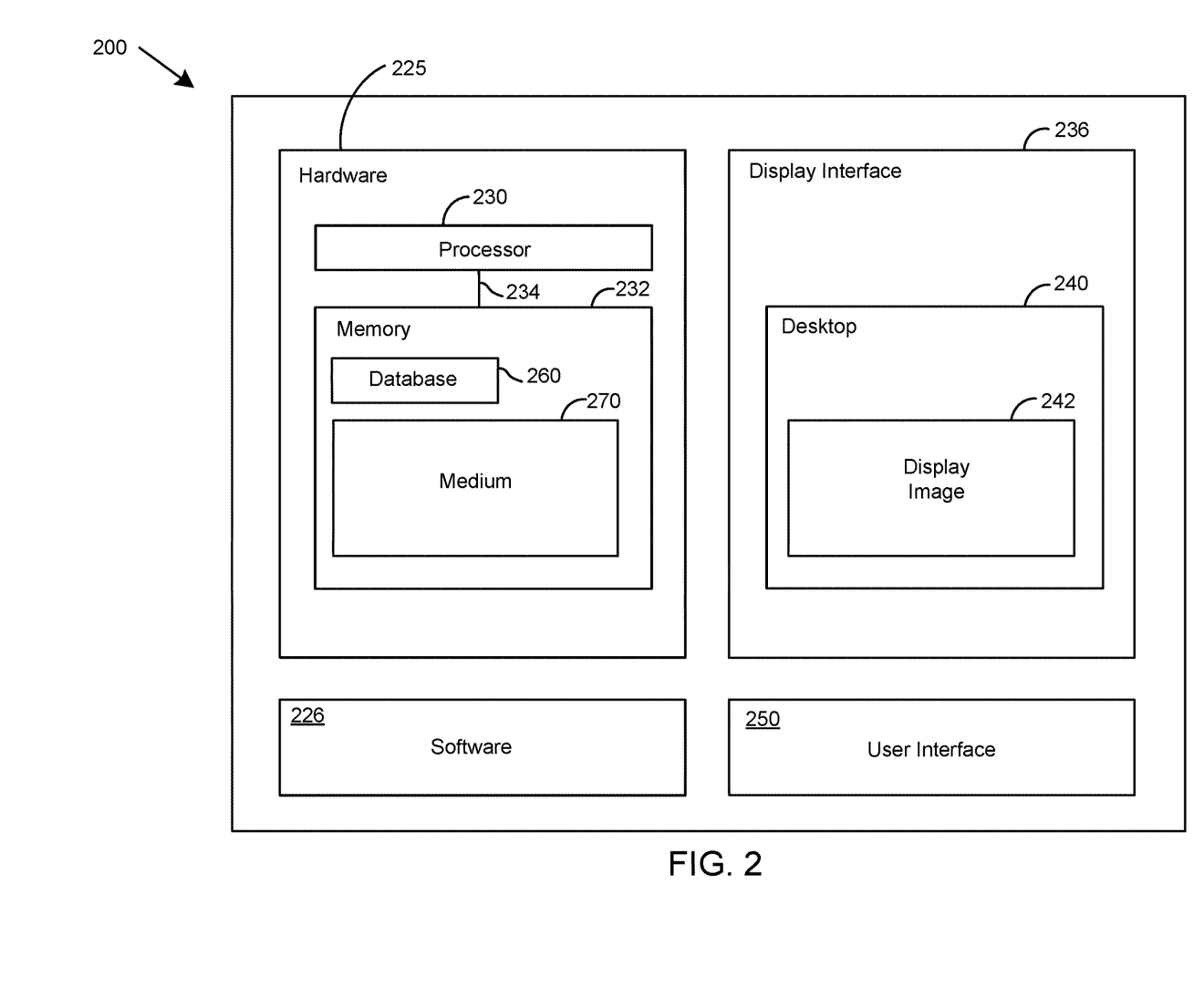
FIG. 2 is a block diagram of an exemplary computing device that can be used with the system shown in FIG. 1, in accordance with some embodiments of the present disclosure.

FIG. 2 is a block diagram of an exemplary computing device 200, which may be used to implement computing device 106 (FIG. 1). In some embodiments, computing device 200 includes a hardware unit 225 and software 226. Software 226 can run on hardware unit 225 such that various applications or programs can be executed on hardware unit 225 by way of software 226. In some embodiments, the functions of software 226 can be implemented directly in hardware unit 225, e.g., as a system-on-a-chip, firmware, field-programmable gate array ("FPGA"), etc. In some embodiments, hardware unit 225 includes one or more processors, such as processor 230. In some embodiments, processor 230 is an execution unit, or "core," on a microprocessor chip. In some embodiments, processor 230 may include a processing unit, such as, without limitation, an integrated circuit ("IC"), an ASIC, a microcomputer, a programmable logic controller ("PLC"), and/or any other programmable circuit. Alternatively, processor 230 may include multiple processing units (e.g., in a multi-core configuration). The above examples are exemplary only, and, thus, are not intended to limit in any way the definition and/or meaning of the term "processor."

Hardware unit 225 also includes a system memory 232 that is coupled to processor 230 via a system bus 234. Memory 232 can be a general volatile RAM. For example, hardware unit 225 can include a 32 bit microcomputer with 2 Mbit ROM and 64 Kbit RAM, and/or a few GB of RAM. Memory 232 can also be a ROM, a network interface (MC), and/or other device(s).

In some embodiments, computing device 200 can also include at least one media output component or display interface 236 for use in presenting information to a user. Display interface 236 can be any component capable of conveying information to a user and may include, without limitation, a display device (not shown) (e.g., a liquid crystal display ("LCD"), an organic light emitting diode ("OLED") display, or an audio output device (e.g., a speaker or headphones)). In some embodiments, computing device 300 can output at least one desktop, such as desktop 240. Desktop 240 can be an interactive user environment provided by an operating system and/or applications running within computing device 200, and can include at least one screen or display image, such as display image 242. Desktop 240 can also accept input from a user in the form of device inputs, such as keyboard and mouse inputs. In some embodiments, desktop 240 can also accept simulated inputs, such as simulated keyboard and mouse inputs. In addition to user input and/or output, desktop 240 can send and receive device data, such as input and/or output for a FLASH memory device local to the user, or to a local printer.

In some embodiments, display image 242 can be presented to a user on computer displays of a remote terminal (not shown). For example, computing device 200 can be connected to one or more remote terminals (not shown) or servers (not shown) via a network (not shown), wherein the network can be the Internet, a local area network ("LAN"), a wide area network ("WAN"), a personal area network ("PAN"), or any combination thereof, and the network can transmit information between computing device 300 and the remote terminals or the servers, such that remote end users can access the information from computing device 200.

In some embodiments, computing device 200 includes an input or a user interface 250 for receiving input from a user. User interface 250 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of the media output component and the input interface. In some embodiments, mobile devices, such as tablets, can be used.

Computing device 200, in some embodiments, can include a database 260 within memory 232, such that various information can be stored within database 260. Alternatively, in some embodiments, database 260 can be included within a remote server (not shown) with file sharing capabilities, such that database 260 can be accessed by computing device 200 and/or remote end users. In some embodiments, a plurality of computer-executable instructions can be stored in memory 232, such as one or more computer-readable storage media 270 (only one being shown in FIG. 2). Computer storage medium 270 includes non-transitory media and may include volatile and nonvolatile, removable and non-removable mediums implemented in any method or technology for storage of information such as computer-readable instructions, data structures, program modules or other data. The instructions may be executed by processor 230 to perform various functions described herein, e.g., steps of the process shown in FIG. 4.

Figure 3A:
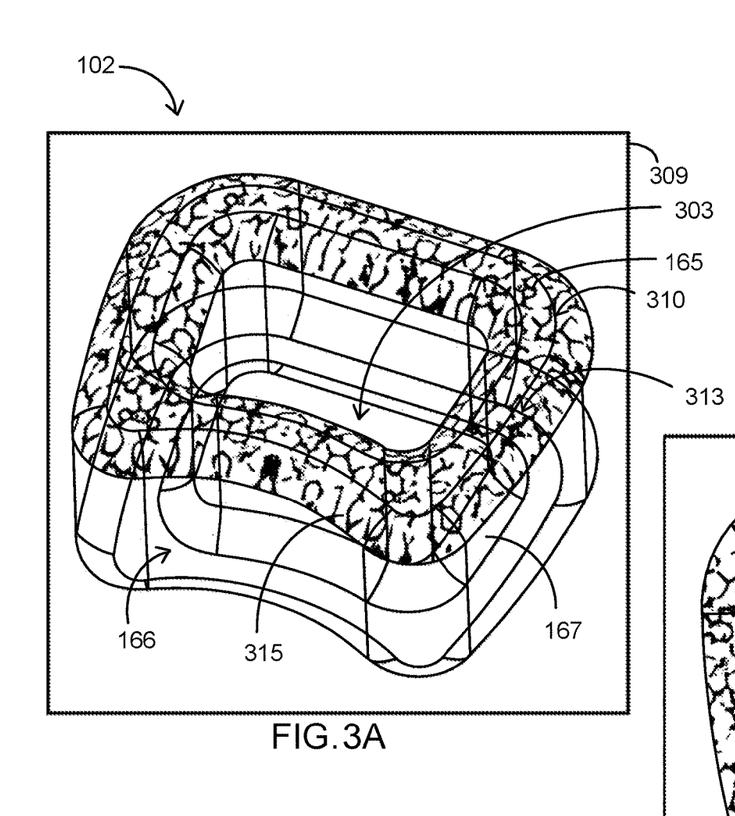
FIG. 3A is a perspective view of the material substrate shown in FIG. 1, in accordance with some embodiments of the present disclosure.
Figure 3B:
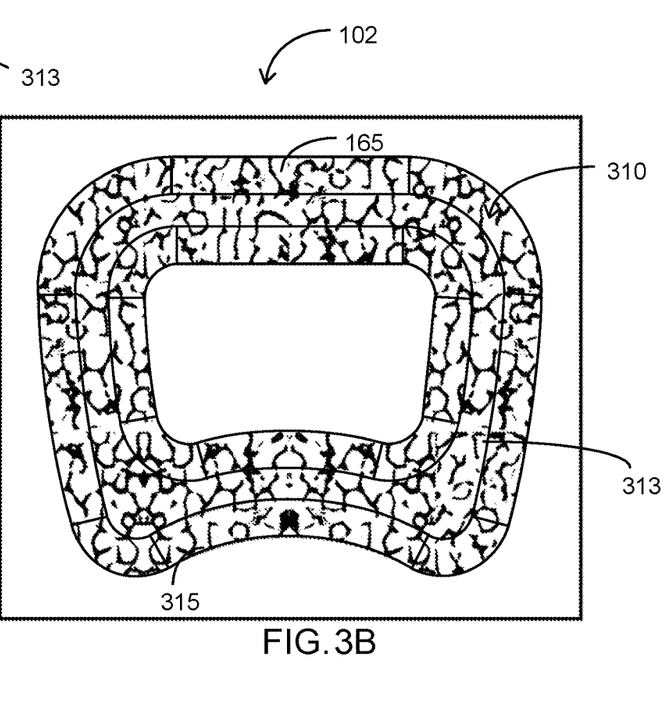
FIG. 3B is a top view of the material substrate shown in FIG. 3A, in accordance with some embodiments of the present disclosure.

FIG. 3A illustrates a perspective view of material substrate 102 and FIG. 3B illustrates a top view of material substrate 102. Material substrate 102 has a substantially cylindrical shape and a channel 303 is defined therein such that channel 103 extends through top exterior surface 165 and bottom exterior surface 166 of material substrate 102. Side exterior surface 167 substantially circumscribes at least a portion of material substrate 102 such that top exterior surface 165, bottom exterior surface 166, and channel 303 are not enclosed or covered by side exterior surface 167. In some embodiments, channel 303 is defined by an interior surface 309. In some embodiments, material substrate 102 may be any suitable GC composite that is synthetically produced, such as an alkali-aluminosilicate. In other embodiments, material substrate 102 may be any appropriate GC composite having various amounts other materials depending on the functionality desired. For example, in photochemistry and heating applications, material substrate 102 may be a GC composite having trace amounts of photo-initiator compounds and nucleating agents to provide photosensitive properties in the material substrate 102. Examples of such photo-initiator compounds and nucleating agents may be cerium and silver respectively.

At least some of the above-referenced components and/or devices of system 100 (shown in FIG. 1) enable a modification to at least a portion of material substrate 102. For example, as shown in FIGS. 3A and 3B, the modification can include a pattern 310 on top surface 165 having dimensions and includes two or more discrete material alterations or changes spatially overlapped within the pattern. The modification can also include patterns that are discretely spaced or separated to create specific functionalities and have variable chemical and physical properties. That is, system 100 is configured for heterogeneous multi-material processing and for the expression of multiple functionalities on material substrate 102. In some embodiments, the design patterns can be, for example, electrically conductive pathways or networks 313 on top exterior surface 165. In some embodiments, the modifications or design patterns can also be made on at least a portion of bottom exterior surface 166, side exterior surface 167, and/or interior surface 309. In some embodiments, the modifications or design patterns can be made in at least a portion of the material (not shown) between top exterior surface 165 and bottom exterior surface 166. In some embodiments, portions of material substrate 102 can be transformed or modified into electrically conductive pathways 315 and the remaining portions of material substrate 102 that are not in the pathways 315 can remain unaltered.

In some embodiments, networks 313 and pathways 315 are designed as diffractive optical elements that are configured for far-infrared and terahertz applications. Networks 313 and pathways 315 can be laser-written phase structures, that include pure lithium metasilicate crystallites that have been formed in the glass in situ. Thus, the material substrate 102 can be patterned as, for example, an optically-active region, by controlling the optical character of the GC substrate during laser photo-modulation.

Figure 4:
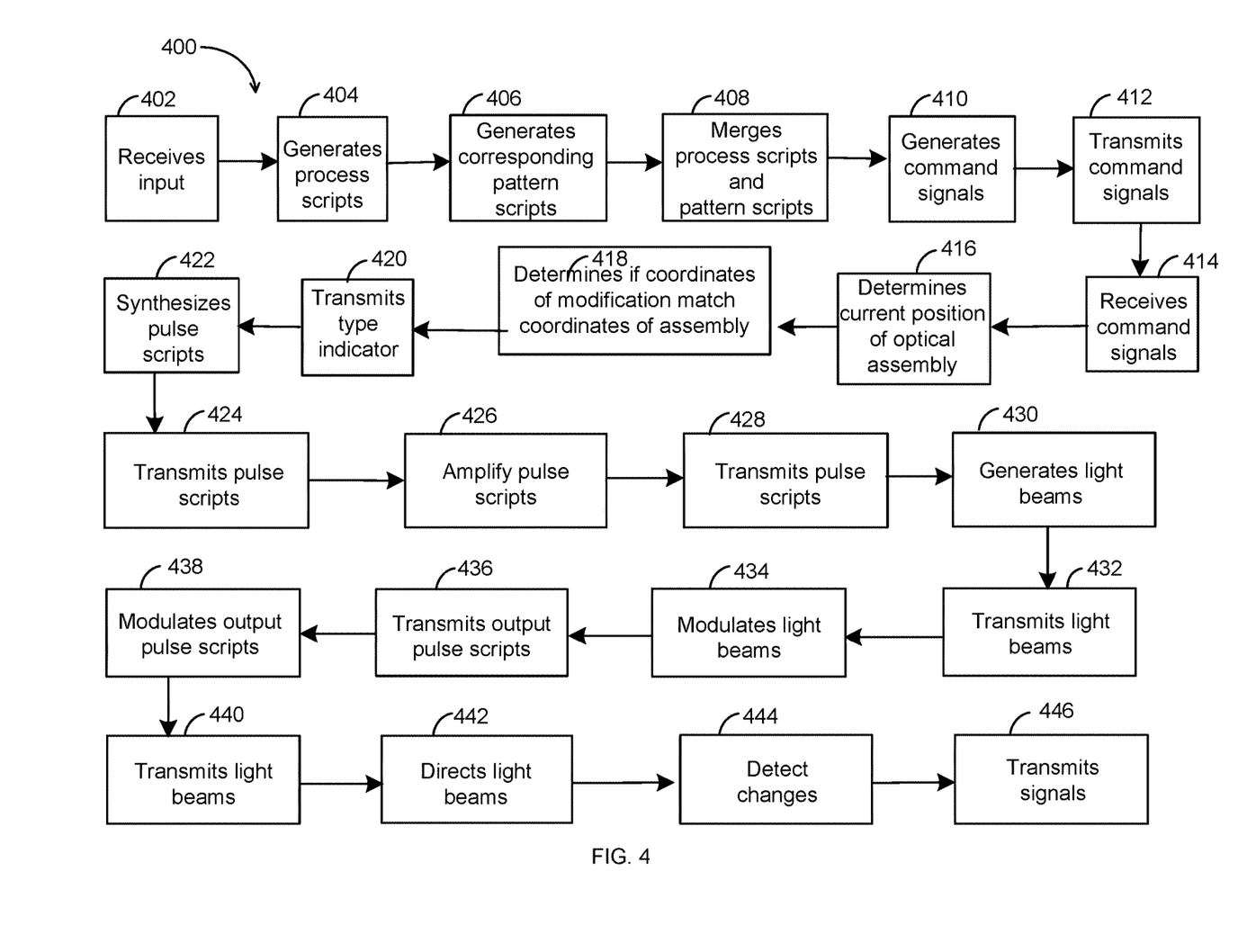
FIG. 4 is a flow diagram of an exemplary method that can be used for a modification of the material substrate using the system shown in FIG. 1, in accordance with some embodiments of the present disclosure.

FIG. 4 is a flow diagram 400 of an exemplary method for modifying a material substrate, such as material substrate 102 (shown in FIGS. 1, 3A, and 3B), using system 100 (shown in FIG. 1). In step 402, computing device 106 (shown in FIG. 1) receives an input from a user to modify material substrate 102. In some embodiments, the desired modification can be creating design patterns, such as networks 313 and pathways 315 (shown in FIGS. 3A and 3B), on at least a portion of top exterior surface 165 (shown in FIGS. 1, 3A, and 3B) pursuant to various different desired parameters for networks 313 and pathways 315, such as desired dimensions and/or desired chemical and/or physical properties. In some embodiments, the desired modifications or design patterns can also be for the bottom exterior surface 166 (shown in FIGS. 1 and 3A), side exterior surface 167 (shown in FIGS. 1 and 3A), and/or interior surface 309 (shown in FIG. 3A) of material surface 102.

Based on the input, in step 404, computing device 106 generates one or more process scripts. In step 406, computing device 106 generates one or more pattern scripts that correspond to the process scripts. In some embodiments, the process scripts include different or discrete genotype pulse scripts or sequences, wherein each of the individual pulse sequences are based on nascent material properties of material substrate 102 and are designed to elaborate or express specific modifications in material substrate 102. The process scripts include all relevant laser material processing parameters that will be applied to material substrate 102 during the modification, and each pulse script or sequence may correspond to an element or feature of the modification. The corresponding pattern scripts, in some embodiments, represent the laser machining code and contain the three-dimensional (3D) (or beyond) Cartesian coordinate information for the tool path geometry. In other words, in some embodiments, each pattern script includes the 3D Cartesian coordinate information for the element or feature of the corresponding process script.

In some embodiments, the pulse scripts can be tailored and designed to elicit a diverse array of material modifications and inductions from the macroscale to the nanoscale. Such material modification and inductions include, but are not limited to, physical effects, such as patterning, structuring, texturing, morphology and topography, compaction and densification, mechanical strength and compliance. Chemical effects are also included, such as phase change, composition and stoichiometry, ferroelectric, pyroelectric and piezoelectric behavior, magnetic induction and electrical conductivity.

In step 408, computing device 106 merges the process script(s) with the pulse script(s). For example, in some embodiments, the process script(s) are merged synchronously with the corresponding pulse script(s). Computing device 106, in some embodiments, is enabled to generate the process and pulse scripts and conduct the merging by being configured or having a processer, such as processor 230 (shown in FIG. 2), be programmed to enable the synchronized delivery of laser pulse sequences or photon exposure doses to material substrate 102 during patterning. For example, computer-assisted design (CAD) and manufacturing (CAM) software can be used that defines 3D pattern geometry and tool path motion and enables the user to select the type and spatial location of the material modification. In some embodiments, such software can be enhanced or modified to enable the line-by-line linking of the laser processing parameters to the motion control code, which facilitates communication between computing device 106 and other components and/or devices of system 100 for position-synchronized administration of prescribed laser pulse sequences.

In step 410, for example, computing device 106, generates a plurality of command signals that are based on the merged process and pattern scripts. In step 412, computing device 106 transmits the generated command signals to other components and/or devices of system 100. In some embodiments, the command signals can be transmitted simultaneously to each of the other components. Alternatively, in other embodiments, the command signals can be transmitted in a sequential order, such as numerical order, to the other components. In some embodiments, the command signals are representative of the various functions that each of the other components are to perform to ensure the desired modification is performed onto material substrate 102 based on the merged pattern script(s) and the process script(s). For example, the command signals can be representative of various functions that each of the other components are to perform to facilitate a modification that includes a pattern on at least a portion of a surface, such as top exterior surface 165, of material substrate 102. In some embodiments, each command signal is representative of the various functions that each of the other components are to perform to ensure that an element of the desired modification is performed onto the material substrate 102. The modification can also include patterns that are discretely spaced or separated (as shown in FIGS. 3A and 3B) to create specific functionalities and have variable chemical and physical properties.

For example, in step 414, motion control drive 110 (shown in FIG. 1) receives at least one of the command signals and, in step 416, motion control drive 110 translates at least a portion of a sample of material substrate 102 into a 3D coordinate system, such as a 3D x-y-z Cartesian coordinate system. In some embodiments, the sample of material substrate 102 is positioned within a holder (not shown) of motion control drive 110.

In step 416, the motion control stage 112 determines the current position of the optical assembly 160 as a set of 3D Cartesian coordinates. The motion control stage 112 then transmits the coordinates, encoded as a series of pulses by the motion stage encoder, to the motion control drives 110. In some embodiments, the motion control stage 112 may continuously delineate the progression of a predefined distance along the three-dimensional tool path pattern.

In step 418, motion control drive 110 determines the 3D Cartesian coordinates of an element of the desired modification based on the received command signal. Motion control drive 110 receives the current position of the optical assembly 160 from the motion stage encoder 112 and compares the current position of the optical assembly 160 to the coordinates of the current element of the desired modification. If the coordinates match, motion control drive 110 generates at least one output that provides instructions for the type of pulse script (a type indicator) in the pulse scripts to be used for the modification to material substrate 102, wherein the instructions are based on the command signal that is received. For example, in some embodiments, the instructions can be instructions on how to modulate the pulse scripts for the intended modification. In step 420, motion control drive 110 transmits the type indicator signal representative of the output to waveform generator 124 (shown in FIG. 1) via second synch circuit 120 (shown in FIG. 1). In some embodiments, second synch circuit 120 facilitates transmitting the signals based on the command signals that it receives directly from computing device 106.

In step 422, waveform generator 124 receives the type indicator signal and synthesizes the pulse scripts based on the output. In some embodiments, such as in step 424, the newly synthesized pulse scripts are transmitted to amplifier 136 (shown in FIG. 1). In step 426, the transmitted pulse scripts are then amplified via amplifier 136. The newly synthesized and amplified pulse scripts are then transmitted to first EO modulator cell 142 (shown in FIG. 1) in step 428.

In step 430, laser 130 (shown in FIG. 1) generates a plurality of light beams based on signals received from master oscillator delay generator 126 (shown in FIG. 1). In some embodiments, master oscillator delay generator 126 facilitates the generation of the light beams based on command signals received directly from computing device 106. In step 432, laser 130 transmits the light beams to first EO modulator cell 142. In step 434, first EO modulator cell 142 modulates the light beams from laser 130 with the amplified pulse scripts to create the output pulse scripts pursuant to the desired modification (i.e., based on the command signals received from computing device 106). In some embodiments, synch circuit 120 facilitates the timing of the transmission of the amplified pulse scripts (step 424) and light beams (step 432) to first EO modulator cell 142 to ensure synchronization of the modulated pulse script delivery to the desired location on the material substrate 102.

After receiving the pulse scripts and the light beams, first EO modulator cell 142 transmits the output pulse scripts and newly modulated light beams to second EO modulator cell 144 (shown in FIG. 1) in step 436. After receiving the output pulse scripts and modulated light beams from first EO modulator cell 142, second EO modulator cell 144 further modulates the output pulse scripts and light beams pursuant to the desired modification in step 438 (i.e., based on the command signals received from computing device 106, and/or motion control apparatus 108, and/or waveform generator 124). In some embodiments, the newly synthesized pulse scripts can be transmitted to amplifier 140 (shown in FIG. 1), similar to step 426. The transmitted pulse scripts are then amplified via amplifier 140, similar to step 428. The newly synthesized and amplified pulse scripts are then transmitted to second EO modulator cell 144 (shown in FIG. 1). In some embodiments, this further modulation changes the polarization of the light beams. Accordingly, in steps 436 to 438, the pulse scripts can be modulated, for example, in amplitude (intensity), pulse duration (pulse width), frequency (repetition rate), spatial profile (energy distribution) and/or polarization (electric-field orientation), or any combination thereof to facilitate the changes of the light beams, which may be needed to achieve the desired modification. In some embodiments, synch circuit 120 facilitates the timing of the transmission of the amplified pulse scripts and light beams (steps 432) to second EO modulator cell 144 to ensure synchronization of the modulated pulse script delivery to the desired location on the material substrate 102.

In step 440, second EO modulator cell 144 transmits the light beams combined with the further modulated output pulse scripts to optical assembly 160 (shown in FIG. 1). In step 442, optical assembly 160 directs the light beams onto material substrate 102, such as, for example, at least a portion of top exterior surface 165 of material substrate 102 to create the modification onto at least the portion of surface 165 such that the modification includes a pattern on at least a surface of material substrate 102. The modification can also include patterns that are discretely spaced or separated to create specific functionalities and have variable chemical and physical properties. In another embodiment, optical assembly 160 can direct the light beams onto other portions of material substrate 102, such as bottom exterior surface 166, side exterior surface 167, and/or interior surface 309 to facilitate the same modification.

In some embodiments, the modification being done to material substrate 102 can be monitored in real-time. For example, in step 444, spectrometer 116 (shown in FIG. 2) can detect the changes being made to material substrate 102, such as detecting the various chemical and physical property changes to material substrate 102. In step 446, spectrometer 116 transmits a signal representative of the detected changes to computing device 102. After receiving the detected changes, computing device 106 determines whether the detected changes are consistent with the desired modification that was requested by the user. If the detected changes are deemed consistent, then computing device 106 lets the method continue. For example, computing device 106 may receive a command signal corresponding to the next element of the desired modification and repeat steps 414-446 until each element of the desired modification has been made. If, however, the detected changes are not deemed consistent, then computing device 106 generates one or more updated pattern scripts and one or more updated process scripts, and these updated pattern scripts and process scripts are used for the process as steps 404 to 451 are repeated until the desired modification is created on material substrate 102.

Based on the foregoing, waveform generator 124 enables the creation of a plurality of voltage scripts that can be used for the customization of the light beams that are used. Moreover, motion control apparatus 108 enables controlling the delivery and/or spatial location of each of the pulse sequences. As such, intercommunication link between, for example, modulator cells 142 and 144 and motion control apparatus 108 is based on a series of signal pulses generated from the motion stage encoders (not shown) that delineate the progression of a predefined distance along the 3D tool path pattern.

In some embodiments, the line-by-line matching of the process script and the pattern script is similar to DNA base-pairing in molecular biology, permitting the delivery of discrete pre-defined laser pulse scripts to material substrate 102 on a per-spot basis with resolution below the diffraction limit of light. In some embodiments, the pulse scripts are configured to activate or alter material substrate's 102 native character. For example, material substrate 102 can be transformed to a specific phase or disposition based on the underlying and predetermined fundamental solid state physics and photochemistry. The final state of material substrate 102 can be controlled by thermal and non-thermal channels and realized through chemical pathways or physical pathways. From a single laser process script, which comprises individual genotype pulse scripts, multiple material substrate states and functionalities with high resolution can be defined.

The individual pulse scripts can be based on the underlying chemical physics, solid state dynamics and photochemistry associated with the interactions between laser 130 and material substrate 102. The respective pulses in a sequence or script can be modulated in amplitude (intensity), pulse duration (pulse width), frequency (repetition rate), spatial profile (energy distribution) and polarization (electric-field orientation), or any combination thereof. In some embodiments, the pulse scripts are administered on a spot-by-spot basis, ensuring that each 3D pattern element or voxel receives the prescribed photon sequencing for the desired chemical or physical effect. The pulse scripts can be tailored and designed to elicit a diverse array of material substrate modifications and inductions from the macroscale to the nanoscale.

In some embodiments, materials, such as material substrate 102, can be guided into discrete phases and physical dispositions so that electromechanical behavior is attained. Laser pulse-scripted processing, as described in diagram 400, enables the careful regulation of energy flow into the material system, enabling thermal and non-thermal channels to be accessed for defining the processing mechanisms and the final material state. The laser pulse sequences within a pulse script can be specially devised to account for incubation effects and other time-dependent phenomena associated with the continuous evolution in the material's properties as a result of the laser exposure. For example, changes in morphology and roughness can impact absorptivity and surface reflectivity, and alterations in composition and phase can affect heat capacity, thermal conductivity and diffusivity. The pulse sequencing can accommodate the material dynamics, enabling the controlled delivery of energy into the material system for achieving the desired phase outcome with spatially overlapped structural and chemical modifications.

The ability to induce patterned, site-selective phase transformation and electromechanical activation in a GC substrate in a single step enables the rapid design of complex, highly integrated systems within the GC substrate. Such systems include photonic, bionic, and electronic systems among others. The embodiments described herein target the preparation of GC materials whose electrical and optical characteristics, mechanical compliance, and chemical solubility can be controllable through the laser modulation process. By controlling the photophysics and photochemistry of the GC during photo exposure, the invention enables specific silicate phases to be laser patterned into the glass matrix in situ.

Exemplary embodiments of the systems and methods are described above in detail. The systems and methods are not limited to the specific embodiments described herein, but rather, components of the systems and/or steps of the method may be utilized independently and separately from other components and/or steps described herein. For example, the system may also be used in combination with other systems and methods, and is not limited to practice with only a system as described herein. Rather, the exemplary embodiment can be implemented and utilized in connection with many other systems.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A modification assembly comprising:
a computing device configured to:
    generate at least one process script for the modification to at least one material substrate;
    generate at least one pattern script that corresponds to the at least one process script, for the modification to the at least one material substrate;
    merge the generated at least one process script with the corresponding generated at least one pattern script; and
    generate a plurality of command signals that are based on the merged generated at least one process script and the corresponding generated at least one pattern script, wherein the at least one command signal includes one or more pulse scripts and corresponding 3D coordinates, and wherein the one or more pulse scripts and the corresponding 3D coordinates are associated with a 3D pattern element of the modification to the at least one material substrate;
an energy source configured to couple to said computing device, wherein said energy source is further configured to generate a plurality of light beams based on at least one of the plurality of command signals;
a motion control drive configured to couple to said computing device and said energy source, wherein said motion control drive is further configured to generate a waveform type indicator based on the at least one of the plurality of command signals;
a waveform apparatus configured to couple to said computing device, said energy source, and said motion control drive, wherein said waveform apparatus is further configured to generate at least one waveform signal based on the at least one of the generated plurality of command signals and the waveform type indicator;
at least one modulating component configured to couple to said computing device, said energy source, said motion control drive, and said waveform generator, wherein said at least one modulating component is further configured to modulate the generated plurality of light beams with the at least one waveform signal based on the at least one of the plurality of command signals;
an optical assembly configured to couple to the at least one modulating component, said optical assembly is further configured to apply the modulated plurality of light beams to the at least one material substrate; and
at least one motion stage encoder configured to couple to said motion control drive and said optical assembly, wherein said motion stage encoder is further configured to provide at least one three dimensional (3D) coordinate position of said optical assembly with respect to said motion control drive in order to coordinate application of the modulated plurality of light beams with a predefined spatial location; and
a spectrometer configured to be coupled to said computing device, wherein said spectrometer is further configured to:
    detect whether the application of the modulated plurality of light beams to the at least one material substrate has resulted in the 3D pattern element of the modification associated with the at least one command signal; and
    transmit to said computing device at least one signal representative of the application of the modulated plurality of light beams to the at least one material substrate resulting in the 3D pattern element of the modification associated with the at least one command signal; and
wherein said computing device is further configured to:
    provide at least one command signal associated with a different 3D pattern element of the modification to the material substrate; or
    generate at least one updated pattern script and at least one updated process script.

2. The modification assembly of claim 1, wherein said motion control drive is further configured to generate the waveform type indicator when the at least one 3D coordinate position of the optical assembly matches the 3D coordinates of the at least one command signal.

3. The modification assembly of claim 1, wherein the one or more pulse scripts included in the at least one command signal are based, at least in part, on at least one property of the at least one material substrate.

4. The modification assembly of claim 1, wherein the at least one 3D coordinate position is a series of signal pulses delineating the progression of a predefined distance along a 3D tool path geometry of the modification to the at least one material substrate.

5. A system comprising:
a glass ceramic (GC) substrate; and
a modification assembly positioned proximate to said GC substrate, wherein said modification assembly comprises:
    a computing device configured to:
        generate at least one process script for the modification to at least one material substrate, generate at least one pattern script that corresponds to the at least one process script, for the modification to the at least one material substrate;

merge the generated at least one process script with the corresponding generated at least one pattern script; and generate a plurality of command signals that are based on the merged generated at least one process script and the corresponding generated at least one pattern script, wherein the at least one command signal includes one or more pulse scripts and corresponding 3D coordinates, and wherein the one or more pulse scripts and the corresponding 3D coordinates are associated with a 3D pattern element of the modification to the GC substrate;

an energy source configured to couple to said computing device, wherein said energy source is further configured to generate a plurality of light beams based on at least one of the plurality of command signals;

a motion control drive configured to couple to said computing device and said energy source, wherein said motion control drive is further configured to generate a waveform type indicator based on the at least one of the plurality of command signals;

a waveform apparatus configured to couple to said computing device, said energy source, and said motion control drive, wherein said waveform apparatus is further configured to generate at least one waveform signal based on the at least one of the generated plurality of command signals and the waveform type indicator;

at least one modulating component configured to couple to said computing device, said energy source, said motion control drive, and said waveform generator, wherein said at least one modulating component is further configured to modulate the generated plurality of light beams with the at least one waveform signal based on the at least one of the plurality of command signals;

an optical assembly configured to couple to the at least one modulating component, said optical assembly is further configured to apply the modulated plurality of light beams to the GC substrate; and at least one motion stage encoder configured couple to said motion control drive and said optical assembly, wherein said motion stage encoder is further configured to provide at least one three dimensional (3D) coordinate position of said optical assembly with respect to said motion control drive in order to coordinate application of the modulated plurality of light beams with a predefined spatial location;

a spectrometer configured to be coupled to said computing device, wherein said spectrometer is further configured to:

detect whether the application of the modulated plurality of light beams to the GC substrate has resulted in the 3D pattern element of the modification associated with the at least one command signal; and transmit to said computing device at least one signal representative of the application of the modulated plurality of light beams to the GC substrate resulting in the 3D pattern element of the modification associated with the at least one command signal; and wherein said computing device is further configured to:

provide at least one command signal associated with a different 3D pattern element of the modification to the GC substrate; or generate at least one updated pattern script and at least one updated process script.

6. The modification assembly of claim 5, wherein said motion control drive is further configured to generate the waveform type indicator when the at least one 3D coordinate position of the optical assembly matches the 3D coordinates of the at least one command signal.

7. The modification assembly of claim 5, wherein the one or more pulse scripts included in the at least one command signal are based, at least in part, on at least one property of the GC substrate.

8. The modification assembly of claim 5, wherein the at least one 3D coordinate position is a series of signal pulses delineating the progression of a predefined distance along a 3D tool path geometry of the modification to the GC substrate.

9. A method for modifying at least one material substrate, said method comprising:

generating at least one process script, via a computing device, to modify the at least one material substrate;

generating at least one pattern script that corresponds to the at least one process script, via the computing device, to modify the at least one material substrate;

merging the generated at least one process script with the corresponding generated at least one pattern script;

generating a plurality of command signals that are based on the merged generated at least one process script and the corresponding generated at least one pattern script, wherein the plurality of command signals includes one or more pulse scripts and corresponding 3D coordinates, and wherein the one or more pulse scripts and 3D coordinates are associated with a 3D pattern element of the modification;

generating a plurality of light beams, via an energy source, based on at least one of the plurality of command signals;

generating a waveform type indicator, via a motion control drive, based on the at least one of the plurality of command signals;

generating at least one waveform signal, via a waveform apparatus, based on the at least one of the plurality of command signals;

modulating the generated plurality of light beams with the at least one waveform signal, via a modulating component, based on the at least one of the plurality of command signals;

applying the modulated plurality of light beams to a GC substrate, via an optical assembly;

providing, via a motion stage encoder, at least one three dimensional (3D) coordinate position of the optical assembly with respect to the motion control drive in order to coordinate application of the modulated plurality of light beams with a predefined spatial location; and detecting, via a spectrometer, that the application of the modulated plurality of light beams to the GC substrate has resulted in the 3D pattern element of the modification associated with the plurality of command signals;

transmitting, via the spectrometer, to said computing device at least one signal representative of the application of the modulated plurality of light beams to the GC substrate resulting in the 3D pattern element of the modification associated with the at least one command signal; and at least one of:
- providing, by said computing device, at least one command signal associated with a different 3D pattern element of the modification; or
- generating, by said computing device, at least one updated pattern script and at least one updated process script.

10. The method of claim 9, wherein the waveform type indicator is generated when the current 3D coordinate position of the optical assembly matches the 3D coordinates of the at least one command signal.

11. The method of claim 9, wherein the one or more pulse scripts included in the at least one command signal are based, at least in part, on at least one property of the at least one material substrate.

12. The method of claim 9, wherein the at least one motion stage encoder provides the current 3D coordinate position of the optical assembly as a series of signal pulses delineating the progression of a predefined distance along a 3D tool path geometry of the modification.

* * * * *